Nov. 11, 1952  C. C. CAMPBELL  2,617,545
ROTARY FEEDER
Filed Jan. 25, 1949  3 Sheets-Sheet 1
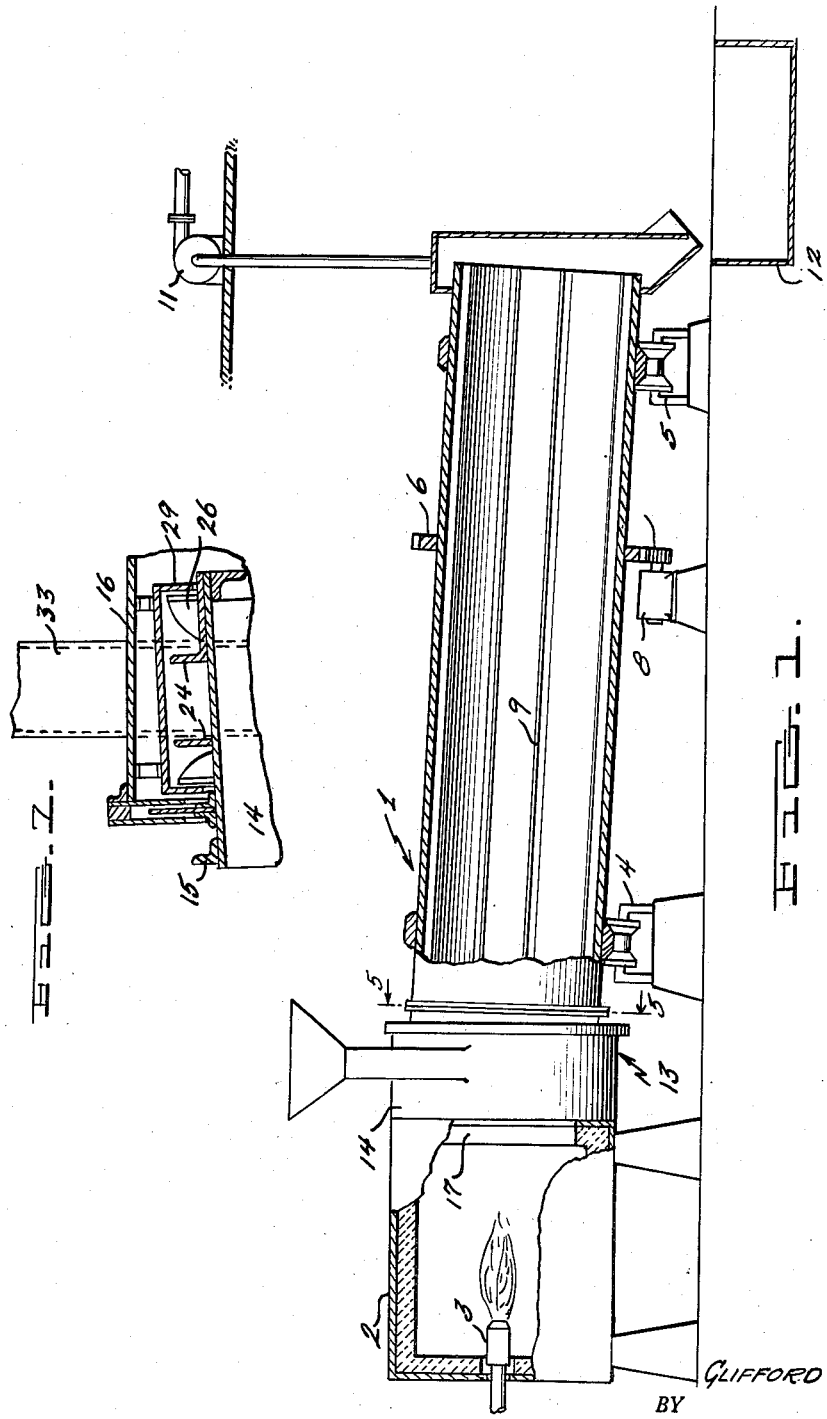
INVENTOR.
CLIFFORD C. CAMPBELL
BY
Semmes, Keegin, Johnson & Semmes
ATTORNEYS

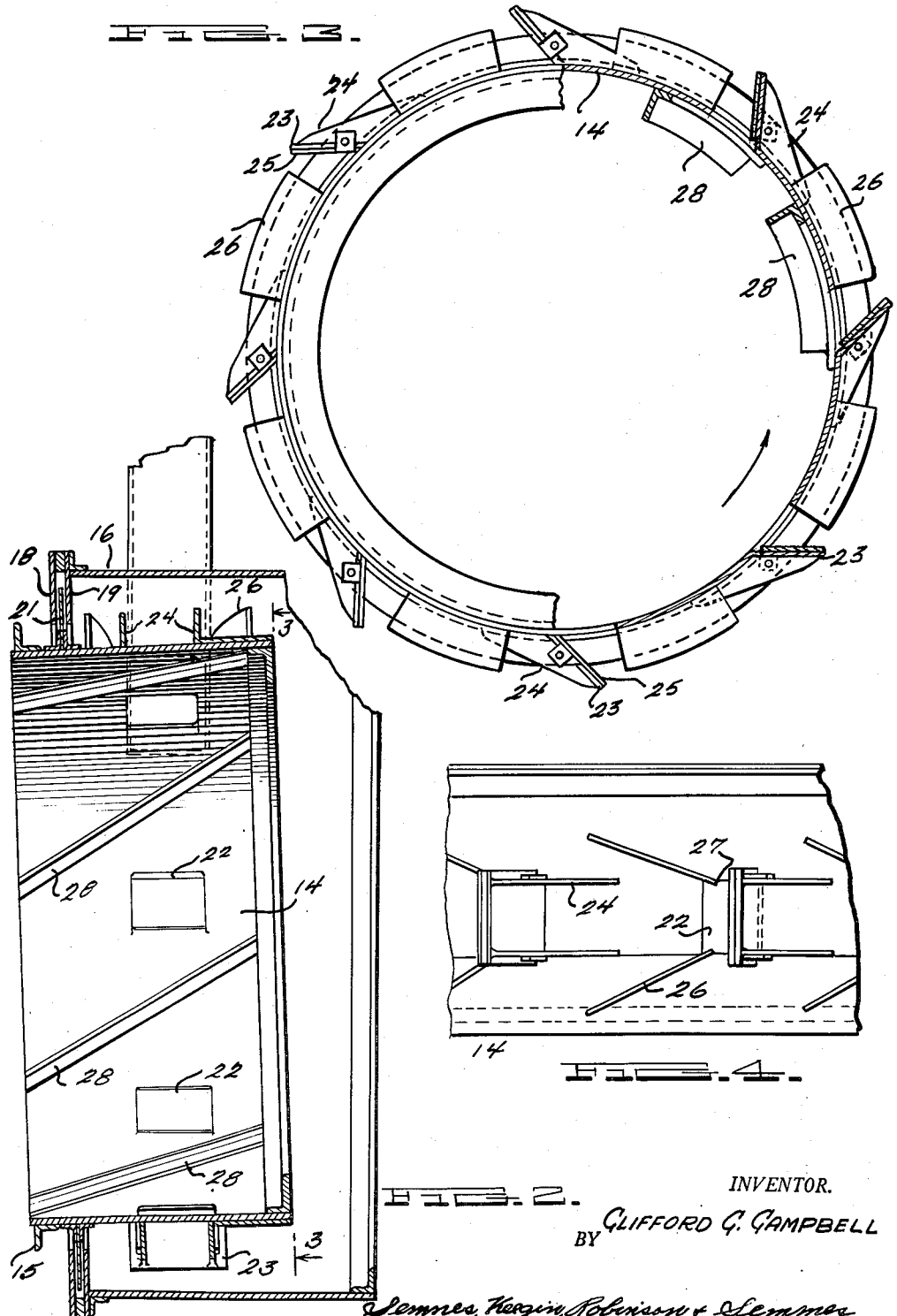

Nov. 11, 1952     C. C. CAMPBELL     2,617,545
ROTARY FEEDER
Filed Jan. 25, 1949     3 Sheets-Sheet 3
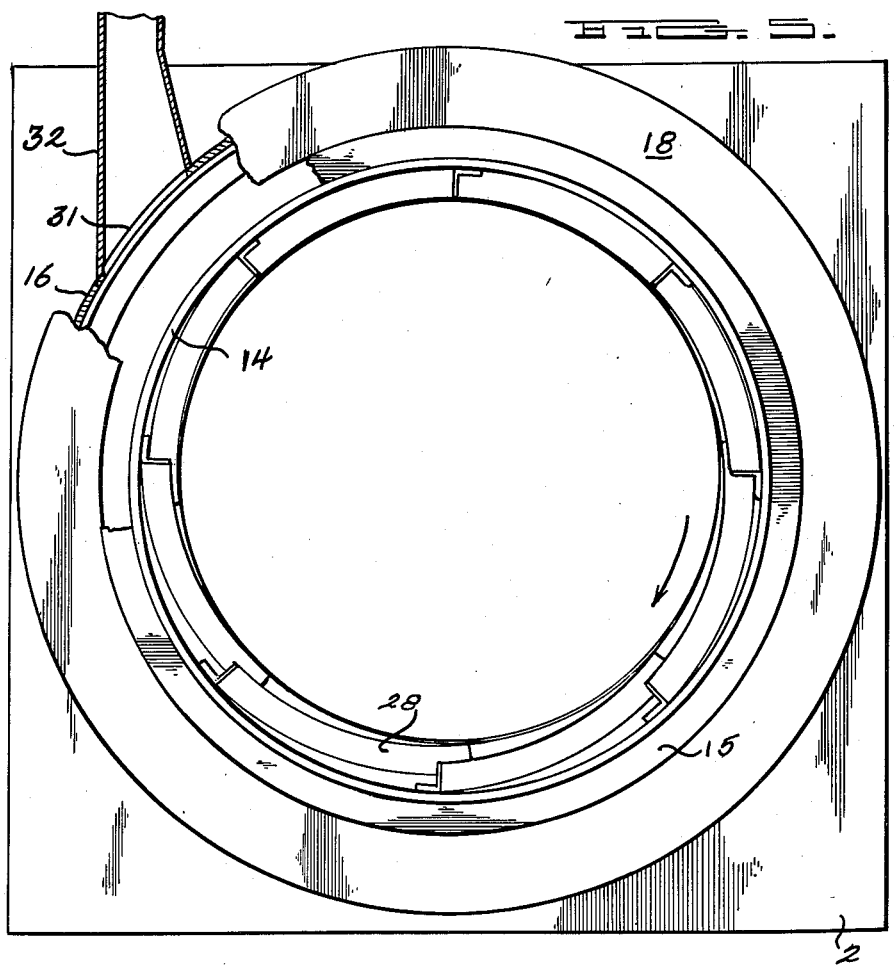
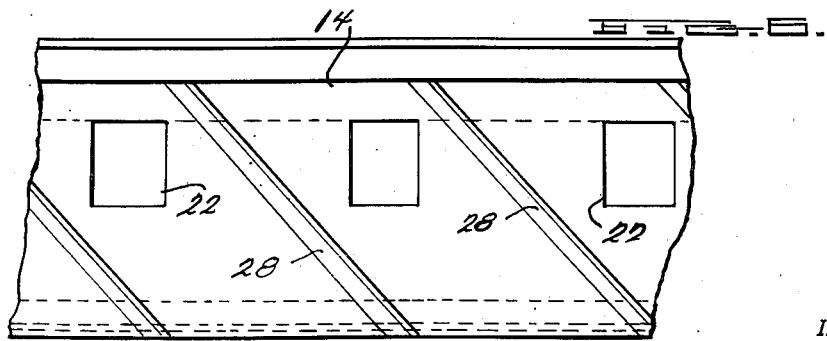
INVENTOR.
CLIFFORD C. CAMPBELL
BY
Semmes, Keegin, Robinson & Semmes
ATTORNEYS Patented Nov. 11, 1952

2,617,545

UNITED STATES PATENT OFFICE 2,617,545

ROTARY FEEDER

Clifford C. Campbell, Lakeland, Fla., assignor to The Davison Chemical Corporation, Baltimore, Md.

Application January 25, 1949, Serial No. 72,584

5 Claims. (Cl. 214—18)

This invention relates to apparatus for the introduction of flowable solids into a rotating treating vessel, and more particularly to apparatus for dropping flowable solids into the vessel in the form of a curtain across its inlet.

While this invention may be used to advantage in many applications, it is of special value for the introduction of a flowable solid material into a direct-fired rotary drier in which hot flue gases from a furnace pass through the drier to remove moisture from the solid material. The usual method of feeding the solid material into the drier is to pass it through an inclined chute protruding into the fire box of the furnace and directing the solid material into the inlet end of the rotating drier. Usually it is necessary to cover the chute, which is ordinarily made of steel, with a thick covering of refractory material to withstand the high temperature and impingement of the flame against the chute. Even with construction of this type the high temperatures and erosion attack the chute and make its frequent replacement necessary.

The presence of the chute in the outlet from the furnace to the drier obstructs the flow of hot gases to the drier and sets up eddy currents interfering with efficient contact of the solids with the hot gases. The contact between the gases and the solids is further decreased by the thick solid stream of solids discharged from the chute, tending to form a pile in the drier and thereby losing the initial dispersion possessed by the solids as they are delivered to the chute.

It is an object of this invention to provide apparatus for introducing a flowable solid material into a rotating shell.

Another object of this invention is to provide apparatus for dropping solid material into a rotary treating vessel in the form of a thin curtain across the inlet to the drier.

A further object of this invention is to provide a feeding apparatus which may be used for long periods without replacement, thereby avoiding shutdowns of the apparatus and reducing maintenance costs.

Still another object of this invention is to provide apparatus for the introduction of a flowable material into a treating vessel which will not obstruct gas flow through the vessel.

It is also an object of this invention to provide feeding apparatus utilizing the dispersion of the material delivered to it to aid in the discharging of a thoroughly disseminated material.

With these and other objects in view, as will become apparent in the following detailed description, this invention resides in a rotating annular shell having holes therein allowing the flowable material to drop through the shell. Means are provided directing the feed material onto the outer surface of the shell and through the holes from which it falls in the form of a thin curtain of material extending across the shell.

In the drawings:

Figure 1 is a vertical elevational view, partly in section, showing an installation of the feeding apparatus of this invention in a direct-fired rotary drier;

Figure 2 is a vertical sectional view across the diameter of the rotary feeding device of this invention;

Figure 3 is a view along the line 3—3 in Figure 2 showing the rotating shell of the feeder of this invention in elevation;

Figure 4 is a plan view of a section of the outer surface of the annular shell;

Figure 5 is a vertical sectional view along section line 5—5 in Figure 1 illustrating the location of the chute delivering material to the feeder;

Figure 6 is a plan view of a section of the inner surface of the shell; and,

Figure 7 is a fragmentary vertical sectional view, similar to Figure 2, of a modified form of this invention.

The apparatus of this invention may be used for the introduction of a flowable material into any tubular conditioner where the material is to be heated, cooled, moistened, or dried. However, the apparatus is most advantageous when used with a direct-fired rotary drier, because of the elimination of the direct contact between the feeding apparatus and the flame of the furnace, in which hot flue gases from a furnace pass through a rotating tubular drier, and will be described in that application.

Referring to Figure 1 of the drawings, a tubular drier 1 is illustrated having a furnace 2 equipped with a burner 3 for supplying the heat necessary for the drying operation adjacent its inlet end. The tubular drier is supported on rolls 4 and 5, which allow it to rotate on an axis inclined slightly from the horizontal in order that the material being dried will progress from the inlet to the discharge end of the drier as the drier rotates. A bull gear 6 is mounted on the external surface of the drier 1 and engages a pinion gear 7, driven by an electric motor 8 to rotate the drier. The drier is preferably equipped with a plurality of baffles 9 on its inner surface, which elevate the material passing through the drier and drop it through the gas space in the drier for contact with the hot gases discharged from the furnace 2. At the lower, or discharge, end of the drier an exhaust fan 11 is provided for the removal of moisture laden gas from the drier. Clearly, the exhaust fan 11 may be replaced by a suitable stack providing the necessary draft to remove the gases. A bin 12 may be provided for the receiving of the dried material discharged from the drier.

The feeder comprising this invention is indicated generally by 13 in Figure 1, and is mounted between the furnace 2 and the inlet end of the drier 1. Referring to Figure 2 of the drawings, the feeder consists of an annular band or shell 14 having a flange 15 at its end adjacent the drier 1 for attachment to the drier. The annular shell 14 rotates with the drier and is enclosed by a hood 16 tightly secured to the discharge end of the furnace 2. The hood 16 surrounds the outlet 17 of the furnace, and thereby directs the flue gases from the furnace to the drier.

A seal consisting of parallel spaced annular bands 18 and 19 secured to the hood on each side of an annular rim 21 extending from the external surface of the shell 14 prevents the flow of hot gases from the hood to the atmosphere. The flexible bands 18 and 19 press against the rim 21 to allow substantially unimpeded rotation of the shell 14 and yet effectively seals the inlet end of the drier to prevent the escape of hot gases. The bands 18 and 19 are in a plane perpendicular to the axis of the drier, and, consequently, inclined slightly from the vertical.

The shell 14 is provided with a plurality of openings 22, which may be formed by striking a section of the shell back to form scoops 23 extending from the external surface of the shell. The scoops 23 extend from the trailing edge of the openings 22 as it rotates with the drier. In most instances it will be desirable to attach brackets 24 to the outer surface of the shell 14 to reinforce the scoops 23. When handling highly abrasive materials, hardened face members 25 are attached to the face of the scoops to resist the abrasion of the material being handled. The face members 25 are preferably attached in a manner to permit easy replacement.

As is best shown in Figure 4, of the drawings, it is desirable to provide a series of flights 26 extending from the outer surface of the shell 14 and converging towards their trailing edge to direct the material into openings 22. The flights 26 preferably terminate a slight distance from the scoops 23, thereby leaving a space 27 through which some of the solids may flow. Allowing some of the material to pass through openings 27 prevents the building up of a cake, which might close the openings 22, on the scoops 23.

A series of baffles 28 are secured to the inner surface of the shell 14. The baffles are inclined with their trailing end adjacent the drier and serve to direct the solids falling through the openings 22 towards the drier. The solids passing through the openings 22 near the bottom of the shell slide along the surface of the shell until they are intercepted by the next baffle. The baffle will, because of the rotation of the shell, then carry the solids along the arc of rotation until they slide from its upper surface and fall across the central opening of the shell.

Again referring to Figure 2 of the drawings, the hood 16 is spaced slightly from the shell, allowing only a slight clearance between the inner surface of the hood and the flights 26 and the scoops 23 protruding from the outer surface of the shell. In some instances it may be desirable that the hood 16 be mounted with the same slope as the drier in order that its inner surface may be parallel to the surface of the shell.

In the modified form of the invention illustrated in Figure 7, a channel shaped ring 29 is rigidly supported from the inner surface of the hood 16, and encloses the flights 26 and scoops 23 on annular shell 14. The ring 29 minimizes the amount of the feed material which may fall out of the range of the flights 26 and scoops 23 and build up a cake in the hood.

The hood 16 has an opening 31 in its outer surface through which the solids pass from a feed chute 32 to the outer surface of the shell 14. The feed chute 32 fits tightly around the opening 31 to prevent the escape of hot gases. The opening 31 and the chute 32 are preferably located approximately 45° above the horizontal diameter of the hood 16 to discharge the feed material on the upwardly moving portion of the shell 14. In this manner the solids passing through the feed chute 32 are directed by the flights and scoops through the openings 22 in the shell. If the modified structure illustrated in Figure 7 is employed, a feed chute 33 passes through an opening in the hood and is attached to the channelled ring 29.

In the operation of this invention, the solids to be dried fall through the feed chute 32 onto the outer surface of the annular shell 14. The solids moving over the outer surface of the shell 14 encounter the flights 26 and the scoops 23 which direct them through the openings 22. The material falling through the openings 22 forms a thin curtain of the feed material through which the hot gases from the furnace pass. In this manner, intimate contact and efficient heat transfer between the gases and the solids is obtained. The solids passing through the shell 14 are directed by the inclined baffles on the inner surface of the shell 14 towards the drier.

In most instances, the solids being dried will be delivered to the chute 32 from some prior operation, which will result in a continuous flow of the solids through the chute. The impact of the solids with the outer surface of the shell 14, flights 26, and the scoops 23 protruding from the outer surface, provide further dispersion of the feed material and aids in the production of a continuous thin curtain of relatively uniform thickness across the central opening of the shell 14. Even if the solid feed material is delivered to the chute in slugs, the impact with the outer surface of the shell 14 will provide effective dispersion of the solids delivered to the drier.

The angular momentum imparted to the material passing through the openings 22, by the rotation of the shell 14, will tend to throw the solid feed material towards the side of the shell remote from the feed chute 32 to form a curtain substantially completely across the central opening of the annular shell. Any solid feed material failing to pass through the openings in its first encounter with the annular shell will fall to the bottom of the hood where it is picked up by the flights and scoops. This material will then be lifted by the continued rotation of the shell and directed through the openings 22 by the flights 26. The provision of the baffles on the inner surface of the shell will lift the feed material passing through the openings 22 at a low position in the shell to an elevation where they will also fall through the hot gases.

The apparatus herein described provides an efficient device for the introduction of solid materials into a rotating treating vessel. The annular shell 14 does not obstruct the flow of hot gases into the drier as did the refractory coated chutes heretofore used. Since the feeding apparatus of this invention is not subject to direct impingement of the flame or hot gases, it may be employed for long periods without requiring replacement or maintenance.

The feeding device of this invention is highly efficient in causing intimate contact of the solids with the hot gases passing through the drier. From the time the solid materials fall through the feed chute they are subjected to a severe and continuous dispersing action to introduce the solids into the drier in the form of an uninterrupted curtain through which the hot gases from the furnace must pass.

While this invention has been described in detail with respect to a particular modification of the invention, it is to be understood that the concept of this invention is not limited to those details, but is determined by the scope of the appended claims.

I claim:

1. Apparatus for the introduction of flowable solids to be dried into a vessel rotating about a substantially horizontal axis comprising an annular shell at the inlet end of the vessel and adapted to rotate therewith, openings in the shell allowing the solids to drop therethrough, a stationary hood enclosing the shell and spaced slightly therefrom, a chute opening through the hood to feed the solids into the space between the shell and the hood, a scoop extending substantially across the trailing edge of each of the openings, and flights on the shell directing the feed material to the openings whereby the solids drop through the shell, the trailing ends of the flights being spaced from the scoops whereby a portion of the solids passes between the flights and the scoops.

2. Apparatus for the introduction of flowable solids into a vessel rotating about a substantially horizontal axis comprising an annular shell at the inlet end of the vessel and adapted to rotate therewith, openings in the shell for the passage of the solids from the outer surface through the shell, scoops extending from the trailing edge of the openings to direct the solids through the openings, flights on the outer surface of the shell directing the solids to the openings, the trailing edge of the flights being spaced slightly from the scoops whereby a portion of the solids may pass between the flights and the scoops to prevent bridging therebetween, a stationary hood enclosing the shell and spaced slightly therefrom, and an inlet chute opening through the hood having the lower edge of the opening above the axis of rotation of the shell, said chute positioned to discharge solids on the ascending outer surface of the shell.

3. Apparatus for the introduction of flowable solids into a vessel rotating about a substantially horizontal axis comprising an annular shell at the inlet end of the vessel adapted to rotate therewith, openings around the periphery of the shell for the passage of solids from the outer surface through the shell, a forwardly inclined scoop across the trailing edge of the opening extending outwardly therefrom to direct the solids across the inlet end of the vessel, flights on the outer surface of the shell on each side of the opening converging at their trailing edge toward the openings, the trailing edge of the flights being spaced slightly from the scoops whereby a portion of the solids may pass between the flights and the scoops to prevent bridging therebetween, a stationary hood enclosing this shell and spaced slightly therefrom, and an inlet chute opening through the hood and having the lower edge of the opening above the axis of rotation of the shell, said chute positioned to discharge solids on the ascending outer surface of the shell.

4. Apparatus for the introduction of flowable solids into a vessel rotating about a substantially horizontal axis comprising an annular shell at the inlet end of the vessel adapted to rotate therewith, openings around the periphery of the shell for the passage of solids from the outer surface through the shell, a forwardly inclined scoop across the trailing edge of the opening extending outwardly therefrom to direct the solids across the inlet end of the vessel, flights on the outer surface of the shell on each side of the opening converging at their trailing edge toward the openings, the trailing edge of the flights being spaced slightly from the scoops whereby a portion of the solids may pass between the flights and the scoops to prevent bridging therebetween, a stationary hood enclosing this shell and spaced slightly therefrom, a ring supported rigidly by the hood and enclosing the shell, said ring having flanges extending adjacent the outer edges of the flights to direct the solids against the flight and a base member extending between the flanges closely spaced from the outer edge of the scoop, and an inlet chute opening through the hood and ring and having the lower edge of the opening above the axis of rotation of the shell, said chute positioned to discharge solids on the ascending outer surface of the shell.

5. Apparatus for the introduction of flowable solids into a vessel rotating about a substantially horizontal axis comprising an annular shell at the inlet end of the vessel adapted to rotate therewith, openings around the periphery of the shell for the passage of solids from the outer surface through the shell, said openings having trailing edges substantially parallel to the axis of rotation of the shell, a flat forwardly inclined scoop across the trailing edge of the opening therefrom to direct the solids across the inlet end of the vessel, flights on the outer surface of the shell on each side of the opening converging at their trailing edge toward the openings, the trailing edge of the flights being spaced slightly from the scoops whereby a portion of the solids may pass between the flights and the scoops to prevent bridging therebetween, a stationary hood enclosing this shell and spaced slightly therefrom, and an inlet chute opening through the hood and having the lower edge of the opening above the axis of rotation of the shell, said chute positioned to discharge solids on the ascending outer surface of the shell.

CLIFFORD C. CAMPBELL.

REFERENCES CITED

The following references are of record in the file of this patent:

UNITED STATES PATENTS

| Number | Name | Date |
| --- | --- | --- |
| 315,508 | Johnson | Apr. 14, 1885 |
| 1,128,592 | Evans | Feb. 16, 1915 |
| 1,415,990 | Carstens | May 16, 1922 |
| 1,793,408 | Kronstad | Feb. 17, 1931 |
| 2,027,977 | Hebley et al. | Jan. 14, 1936 |
| 2,063,446 | Lanzi et al. | Dec. 8, 1936 |

FOREIGN PATENTS

| Number | Country | Date |
| --- | --- | --- |
| 23,589 | Germany | Aug. 11, 1883 |
| 509,906 | Germany | Oct. 13, 1930 |